United States Patent [19]

Suzuki

[11] Patent Number: 4,752,844
[45] Date of Patent: Jun. 21, 1988

[54] TAPE CASSETTE LOADING DEVICE IN A MAGNETIC TAPE RECORDER-REPRODUCER APPARATUS

[75] Inventor: Shoji Suzuki, Iwaki, Japan

[73] Assignee: Alpine Electronics Inc., Japan

[21] Appl. No.: 716,743

[22] Filed: Mar. 27, 1985

[30] Foreign Application Priority Data

Mar. 31, 1984 [JP] Japan ............... 59-45886[U]
Mar. 31, 1984 [JP] Japan ............... 59-45887[U]
Mar. 31, 1984 [JP] Japan ............... 59-45888[U]

[51] Int. Cl.⁴ ............................................. G11B 5/027
[52] U.S. Cl. ........................................ 360/85; 360/95; 360/105; 360/96.5
[58] Field of Search .......... 360/85, 95, 105, 96.1–96.6; 242/55.19 R

[56] References Cited

U.S. PATENT DOCUMENTS

| 3,660,614 | 5/1972 | Swain et al. ............... 360/85 |
| 3,867,720 | 2/1975 | Tanaka ....................... 360/93 X |
| 4,092,686 | 5/1978 | Schulz ........................ 360/95 X |
| 4,514,774 | 4/1985 | Sims, Jr. ..................... 360/85 |
| 4,517,614 | 5/1985 | Straub et al. ............... 360/85 X |
| 4,562,496 | 12/1985 | Saito et al. ................. 360/95 |
| 4,563,717 | 1/1986 | Fleck et al. ................. 360/95 X |
| 4,578,725 | 3/1986 | Muller ........................ 360/85 X |
| 4,580,182 | 4/1986 | Persiani ..................... 360/96.5 |
| 4,583,136 | 4/1986 | Tsuchida et al. .......... 360/95 |
| 4,583,137 | 4/1986 | Ogiro et al. ............... 360/85 X |
| 4,593,330 | 6/1986 | Warren ....................... 360/85 X |
| 4,595,962 | 6/1983 | Costemore d'Arc ...... 360/95 |
| 4,672,485 | 6/1987 | Takahashi .................. 360/96.5 X |

FOREIGN PATENT DOCUMENTS

| 2739127 | 10/1978 | Fed. Rep. of Germany ...... 360/132 |
| 5233513 | 3/1977 | Japan ................................ 360/132 |
| 57-135476 | 8/1982 | Japan ................................ 360/95 |
| 58-115651 | 7/1983 | Japan ................................ 360/95 |
| 58-220266 | 12/1983 | Japan ................................ 360/95 |
| 60-182545 | 9/1985 | Japan ................................ 360/132 |

Primary Examiner—John H. Wolff
Assistant Examiner—Alfonso Garcia
Attorney, Agent, or Firm—Guy W. Shoup

[57] ABSTRACT

A recorder-reproducer includes a rotary head cylinder against which a tape from a tape cassette is slidable, a pair of movable bodies for moving the tape in directions toward and away from the rotary head cylinder, a pair of connectors having ends angularly movably coupled to the movable bodies, respectively, and a sole rotatable body to which opposite ends of the connectors are angularly movably coupled, the rotatable body being rotatable for loading the tape against the rotary head cylinder and unloading the tape away from the rotary head cylinder. The recorder-reproducer also includes a holder for holding the tape cassette therein, a pair of arms movably disposed in the holder for gripping the tape cassette therebetween, and an arm drive means for bringing the arms into and out of the holder. A bearing plate is disposed over the holder, the arm drive means having a pair of levers movably mounted on upper and lower surfaces, respectively, of the bearing plate and operatively coupled respectively to the arms.

3 Claims, 4 Drawing Sheets

TAPE CASSETTE LOADING DEVICE IN A MAGNETIC TAPE RECORDER-REPRODUCER APPARATUS

The subject matter of this application is related to my co-pending U.S. application Ser. No. 724,616.

BACKGROUND OF THE INVENTION

The present invention relates to a recorder-reproducer, and more particularly to a recorder-reproducer having a rotary head cylinder for slidable engagment with a tape.

Conventional recorder-reproducers with a tape cassette loaded therein record analog signals on and reproduce analog signals from a tape. To make tape cassettes smaller in size and record signals at a higher packing density, there is a growing demand for recording and reproducing sounds with digital signals using DAT (digital audio tape), and research and development efforts are now in progress in various laboratories to meet such a demand. However, no preferable recorder-reproducer has yet been proposed for use with DAT.

SUMMARY OF THE INVENTION

It is an object of the present invention to provide a recorder-reproducer capable of recording and reproducing sounds with digital signals.

According to the present invention, there is provided a recorder-reproducer comprising a rotary head cylinder against which a tape from a tape cassette is slidable, a pair of movable bodies for moving the tape in directions toward and away from the rotary head cylinder, a pair of connectors having ends angularly movably coupled to the ovable bodies, respectively, and a sole rotatable body to which opposite ends of the connectors are angularly movably coupled, the rotatable body being rotatable for loading the tape against the rotary head cylinder and unloading the tape away from the rotary head cylinder.

According to the present invention, there is also provided a recorder-reproducer comprising a rotary head cylinder against which a tape from a tape cassette is slidable, a holder for holding the tape cassette therein, a pair of arms movably disposed in the holder for gripping the tape cassette therebetween, and an arm drive means for bringing the arms into and out of the holder.

According to the present invention, there is also provided a recorder-reproducer comprising a rotary head cylinder against which a tape from a tape cassette is slidable, a holder for holding the tape cassette therein, a pair of arms movably disposed in the holder for gripping the tape cassette therebetween, a bearing plate disposed over the holder, and an arm drive means for bringing the arms into and out of the holder, the arm drive means having a pair of levers movably mounted on upper and lower surfaces, respectively, of the bearing plate and operatively coupled respectively to the arms.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A recorder-reproducer according to the present invention primarily comprises a tape cassette loading and unloading mechanism and a tape loading mechanism.

The tape cassette loading and unloading mechanism will first be described with reference to FIGS. 1 through FIGS. 5(a) and 5(b).

Figure 1:
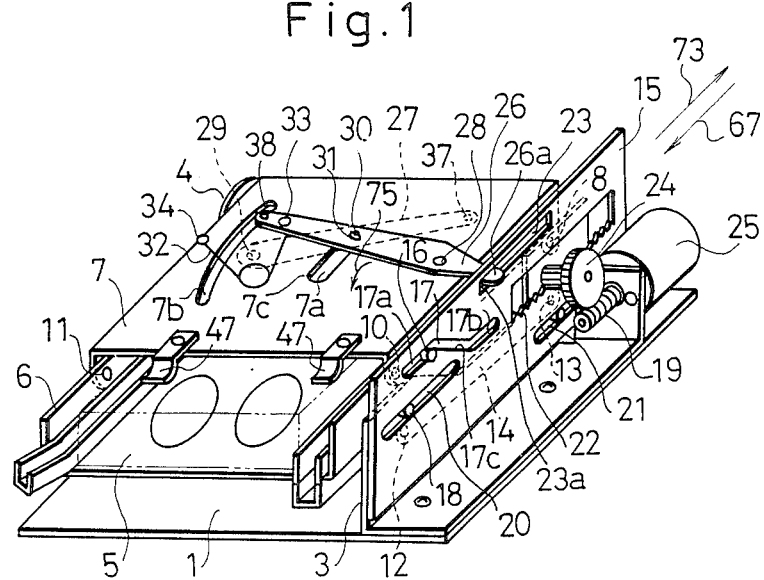
FIG. 1 is a perspective view of a tape cassette loading and unloading mechanism in a recorder-reproducer according to the present invention.
Figure 2:
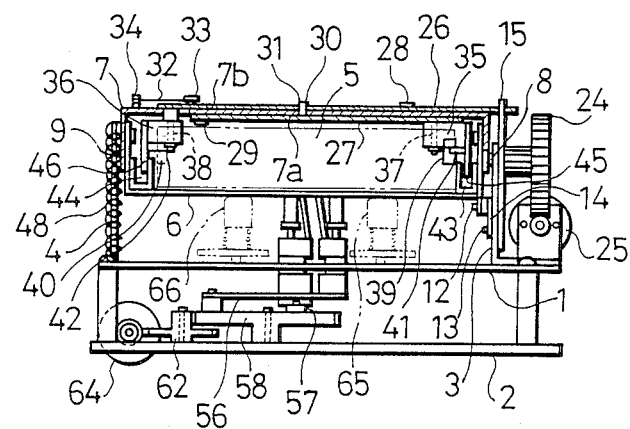
FIG. 2 is a front elevational view, partly in cross section, of the tape cassette loading and unloading mechanism together with a tape loading mechanism.

As shown in FIGS. 1 and 2, a tape cassette loading and unloading mechanism is mounted in its entirety on a subchassis 1 supported on a chassis 2. Brackets 3, 4 are fixed to the subchassis 1. A tape cassette 5, indicated by the two-dot-and-dash lines contains a digital audio tape 5b therein. The tape cassette 5 is held in a holder 6 disposed between the brackets 3, 4. A bearing plate 7 is disposed above the holder 6 and angularly movably supported by pivot shafts 8, 9 on the brackets 3, 4. The bearing plate 7 has a substantially straight, central oblong hole 7a and an arcuate side oblong hole 7b.

The holder 6 and the bearing plate 7 are relatively angularly movably supported by pivot shafts 10, 11. A pivot shaft 12 is mounted on the holder 6 below the pivot shaft 10, and a pivot shaft 13 is mounted on the bracket 3 below the pivot shaft 8. The pivot shafts 12, 13 are coupled by a link 14 as shown also in FIGS. 3 and 4. The link 14, the holder 6, and the bracket 3 are angularly movable with respect to each other.

A slide plate 15 extends parallel to the bracket 3 and is slidable with respect to the subchassis 1. The slide plate 15 has a cam slot 17 in which engages a pin 16 mounted on a side of the holder 6 facing the bracket 3. The slide plate 15 also has slots 20, 21 in which guide pins 18, 19 on the bracket 3 are movably disposed, a rack 22, and a cavity 23. The cam slot 19 has an upper portion 17a extending substantially parallel to the subchassis 1, a lower portion 17b, and a slanted portion 17c extending between the upper and lower portions 17a, 17b. A gear 24 is rotatably supported by a support (not shown) and driven by a motor 25 mounted on the subchassis 1.

A lever 26 is mounted on an upper surface of the bearing plate 7 and a lever 27 is mounted on a lower surface of the bearing plate 7. The levers 26, 27 are angularly movable parallel to the upper and lower surfaces of the bearing plate 7 about pivot shafts 28, 29, respectively, secured to the bearing plate 7. The lever 26 has an end 26a projecting out of the cavity 23 in the slide plate 15 and engageable with an end 23a of the cavity 23. A pin 30 is fixed substantially centrally to the lever 27 and projects upwardly through the oblong hole 7a in the bearing plate 7 and also through a substantially central groove 31 defined in the lever 26. A toggle spring 32 is placed on the upper surface, for example, of the bearing plate 7 and has an end engaging a pivot pin 33 secured to the lever 26 and an opposite end engaging a pivot pin 34 secured to the bearing plate 7.

Figure 5A:
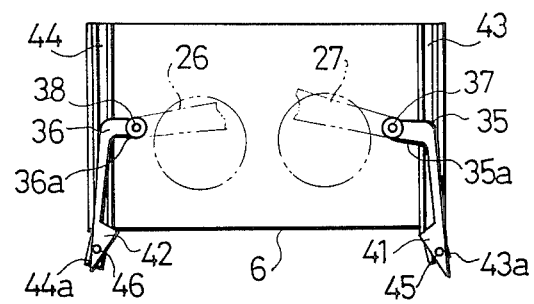
FIG. 5(a) is a fragmentary plan view showing arms positioned before a tape cassette is loaded.
Figure 5B:
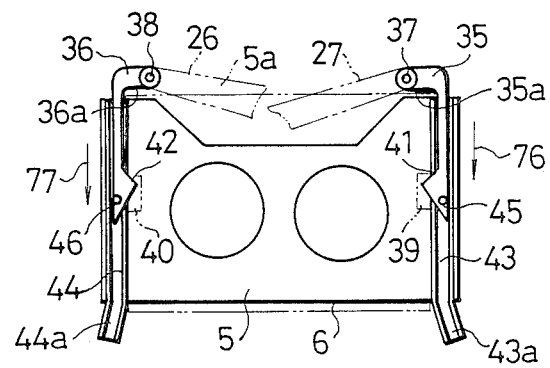
FIG. 5(b) is a fragmentary plan view showing arms positioned when a tape cassette is loaded.

As shown in FIGS. 2, 5(a) and 5(b), arms 35, 36 are mounted angularly movably on the levers 27, 26, respectively, and disposed movably in the holder 6 for gripping the tape cassette 5. The levers 27, 26 are operatively coupled to the arms 35, 36 by pivot shafts 37, 38, respectively. As illustrated in FIGS. 5(a) and 5(b), the arms 35, 36 have fingers 41, 42, respectively, engageable in slots 39, 40 defined in sides of the tape cassette 5, and pins 45, 46 engaging in slots 43, 44 defined in sides of the holder 6. The slots 43, 44 include ends 43a, 44a diverging outwardly. The distance between a front edge 5a of the tape cassette 5 and the slots 39, 40 is equal to the distance between base portions 35a, 36a and the fingers 41, 42 of the arms 35, 36.

Figure 3:
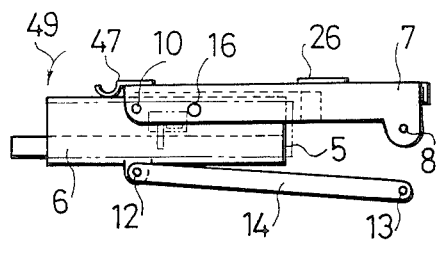
FIG. 3 is a side elevational view of the tape cassette and unloading mechanism with parts positioned before a holder is lowered.
Figure 4:
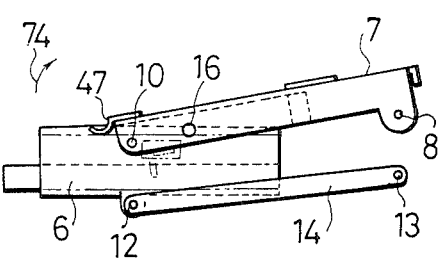
FIG. 4 is a side elevational view of the tape cassette and unloading mechanism with parts positioned after a holder is lowered.

The tape cassette 5 as accommodated in the holder 6 is held in place by retainer springs 47 as shown in FIGS. 1, 3, and 4. A spring 48 shown in FIG. 2 has one end engaging the bearing plate 7 and an opposite end engaging the subchassis 1 for normally urging the bearing plate 7 to move in the direction of the arrow 49 in FIG. 3.

The tape loading mechanism will now be described will be described with reference to FIGS. 6 through 8.

A rotary head cylinder 50 with magnetic heads (not shown) mounted thereon is composed of an upper rotatable portion and a lower nonrotatable portion which is fixed to the chassis 2. The subchassis 1 has a pair of straight guide slots 51, 52 progressively spreading away from each other and having ends 51a, 52a located slightly beyond an imaginary line 53 extending parallel to the front edge 5a of the tape cassette 5 as placed in the holder 6 and passing diametrically across the rotary head cylinder 50, as shown in FIG. 6.

Movable bodies 54, 55 are movable along the guide slots 51, 52, respectively, for moving the tape 5b from the tape cassette 5 in directions toward and away from the rotary head cylinder 50. The movable body 54 comprises a base 54a mounted on the subchassis 1, a pair of shafts 54b, 54c fixed to a lower surface of the base 54a and disposed movably in the guide slot 51, a guide post 54d and an inclined post 54e secured to an upper surface of the base 54a for guiding the tape 5b, and a support 54f disposed on a lower surface of the shaft 54c. Likewise, the movable body 55 includes a base 55a, shafts 55b, 55c, a guide post 55a, an inclined post 55e, and a support 54f.

Connectors 56, 57 have ends angularly movably coupled to the supports 54f, 55f, respectively, of the movable bodies 54, 55, and opposite ends angularly movably coupled to a single rotatable body 58 having a circular shape, for example. The rotatable body 58 has gear teeth 58a around a circumferential edge thereof, and is rotatable about a pivot shaft 59 secured to the chassis 2, for example. The opposite ends of the connectors 56, 57 are coupled to the rotatable body 58 by pivot shafts 60, 61 located adjacent to the circumferential edge of the rotatable body 58 and spaced a distance from each other. The connectors 56, 57 lie at different heights so that they will not interfere with each other while they are angularly moved.

Figure 6:
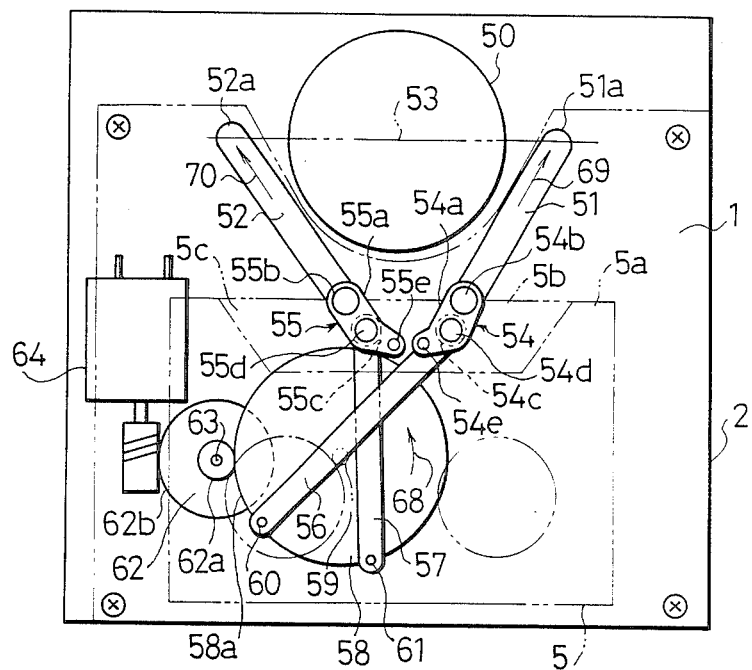
FIG. 6 is a plan view of the tape loading mechanism in the recorder-reproducer of the invention, illustrating the parts position prior to tape loading.
Figure 7:
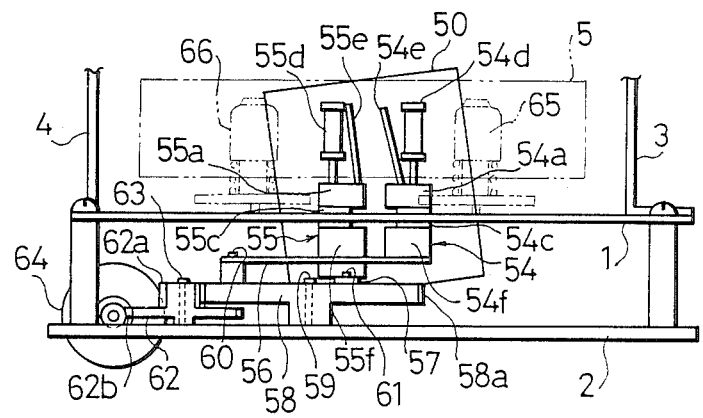
FIG. 7 is a fragmentary front elevational view of the tape loading mechanism shown in FIG. 6.
Figure 8:
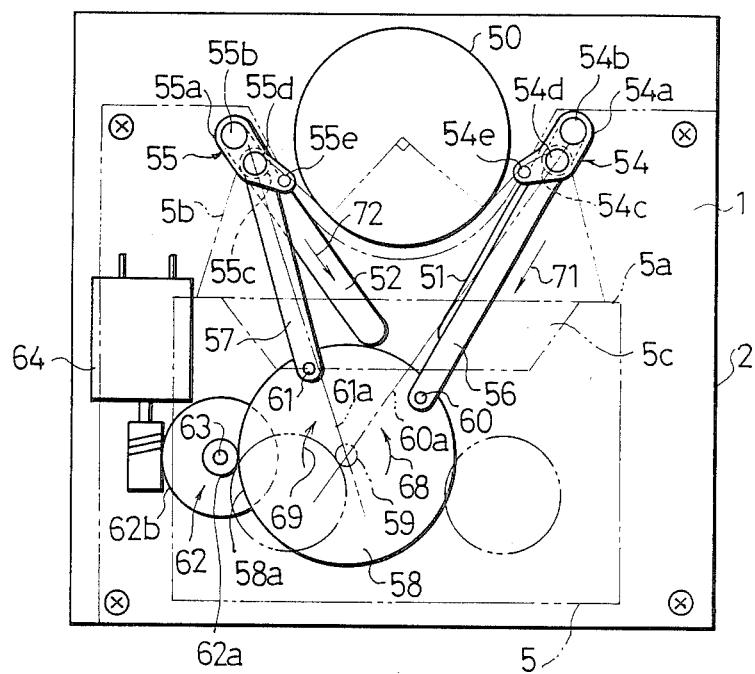
FIG. 8 is a plan view of the tape loading mechanism with parts positioned after a tape has been loaded.

The pivot shafts 60, 61 are movable from the position of FIG. 6 to the position of FIG. 8 as the rotatable body 58 rotates, that is, from the position of FIG. 6 to the position in which the pivot shafts 60, 61 are located symmetrically with respect to the pivot shaft 59 or 180° angularly spaced from the their position shown in FIG. 6. When the movable body 54 is moved to the position of FIG. 8, the pivot shaft 60 is positioned beyond an imaginary line 60a connecting the pivot shaft 69 and the shaft 54c of the movable body 54. When the movable body 55 is moved to the position of FIG. 8, the pivot shaft 61 is positioned beyond an imaginary line 61a connecting the pivot shaft 59 and the shaft 55c of the movable body 55.

A gear 62 is rotatable about a pivot shaft 63 and comprises a smaller-diameter gear section 62a meshing with the gear teeth 58a of the rotatable body 58 and a larger-diameter gear section 62b disposed below the smaller-diameter gear section 62a. The gear 62 is rotated by a motor 64 mounted as on the chassis 2.

The tape 5b is supplied by a supply reel 65, indicated by the two-dot-and-dash line, and wound by a takeup reel 66, indicated by the two-dot-and-dash line. The reels 65, 66 are rotated by a reel drive means, not shown.

Operation of the recorder-reproducer thus constructed is as follows:

First, loading the tape cassette 5 into the holder 6 and loading the tape 5a will be described.

Before the tape cassette 5 is loaded, the fingers 41, 42 of the arms 35, 36 are positioned outside of the holder 6, or in the vicinity of the ends 43a, 44a of the slots 43, 44 as shown in FIG. 5(a), and are spread away from each other to allow insertion of the tape cassette 5. The pin 30 by which the levers 26, 27 are interconnected is positioned at an end 7c (FIG. 1) of the oblong hole 7a in the bearing plate 7. The end 26a of the lever 26 is thus widely spaced from the end 23a of the cavity 23. The pin 16 on the side of the holder 6 is positioned in the upper portion 17a of the cam slot 17 in the slide plate 15.

When the tape cassette 5 is inserted into the holder 6, the tape cassette 5 is pressed by the retainer springs 47 down against the bottom of the holder 6. The front edge 5a is brought into engagement with the base portions 35a, 36a of the arms 35, 36 and at the same time the fingers 41, 42 of the arms 35, 36 engage respectively in the slots 39, 40 in the tape cassette 5, whereupon the tape cassette 5 is clamped by the arms 35, 36. As the tape cassette 5 is further pushed in, the pins 45, 46 on the arms 35, 36 are guided in the slots 43, 44 while at the same time the arms 35, 36 are moved into the holder 6. Upon continued movement of the arms 35, 36, the pivot shafts 28, 33, 34 are brought into line with each other as shown in FIG. 1 to reach the "dead point" of the toggle spring 32, beyond which the levers 26, 27 is snapped to turn about the pivot shafts 28, 29 under the resiliency of the toggle spring 32. The arms 35, 36 and hence the tape cassette 5 are now forcibly drawn into the tape cassette 5. When the pin 30 abuts against the end of the oblong hole 7a, the angular movement of the levers 26, 27 comes to a stop, and hence the arms 35, 36 and the tape cassette 5 are stopped against movement.

The above angular movement of the levers 26, 27 is permitted by the pin 30 moving in the groove 31 in the lever 26. The slide plate 15 and the end 26a of the lever 26 are relatively positioned such that the end 26a will not engage the end 23a of the cavity 23. The tape cassette 5 is not positioned over the reels 65, 66 as shown in FIGS. 5(b), 3, 1, and 2.

When a drive signal from a control unit (not shown) is applied to the motor 25, the motor 25 is energized to rotate the gear 24 for thereby cause the rack 22 meshing with the gear 24 to move the slide plate 15 in the direction of the arrow 67 in FIG. 1. The pin 16 on the holder 6 is then caused to move from the upper cam portion 17a through the slanted cam portion 17b into the lower cam portion 17c. The movement of the pin 16 together with the resilient force from the spring 28 in FIG. 2 causes the bearing plate 7 to turn about the pivot shafts 8, 9 in the direction of the arrow 49 in FIG. 3, whereupon the link 14 is also turned about the pivot shaft 18 secured to the bracket 3 in the direction of the arrow 49. Therefore, a rectangular parallelepiped formed by the pivot shafts 8, 10, 12, 13 varies its form while maintaining its shape as a rectangular parallelepiped for thereby lowering the tape cassette 5, as horizontally maintained, into the position on the reels 65, 66 for tape loading.

After the tape cassette 5 has been positioned in place, the motor 25 is stopped against rotation, and, as illustrated in FIG. 6, the guide posts 54d, 55d and the inclined posts 54e, 55e on the movable bodies 54, 55 are positioned in a recess 5c defined in the tape cassette 5, so that the tape 5b can be pulled by these posts out of the tape cassette 5.

A drive signal is now issued from the non-illustrated control unit to the motor 64 (FIGS. 6-8) to energize the motor 64 for rotating the gear 62 through the gear section 62b. The rotatable body 58 is then rotated about the pivot shaft 59 in the direction of the arrow 68 (FIG. 6) through the gear section 62a and the gear teeth 58 meshing therewith. The pivot shafts 60, 61 then rotate with the rotatable body 58, moving the connectors 56, 57 to cause the movable bodies 54, 55 coupled to the ends thereof to be moved while the shafts 54b, 54c, 55b, 55c are being guided by the guide slots 51, 52. The movable bodies 54, 55 are moved in the directions of the arrows 69, 70 (FIG. 6) without being rotated about their own axes or while keeping their own orientation unchanged.

As the movable bodies 54, 55 are thus moved, the guide posts 54d, 55d and the inclined posts 54e, 55e engage the tape 5b in the tape cassette 5 and then draws the tape 5b out of the tape cassette 5. When the rotatable body 58 has made a substantially half revolution, the shafts 54b, 55b of the movable bodies 54, 55 engage the ends 51a, 52a of the guide slots 51, 52, as shown in FIG. 8. The movable bodies 54, 55 are now stopped with the tape 5b held against a circumferential surface of the rotary head cylinder 50 through an about 90° arc, and the tape loading operation is completed.

After the movable bodies 54, 55 are stopped, the motor 64 is also stopped. When the movable bodies 54, 55 are stopped, the pivot shaft 60 is positioned short of the imaginary line 60a connecting the pivot shafts 59, 54c, and the pivot shaft 61 is positioned beyond the imaginary line 61a connecting the pivot shafts 59, 55c. Therefore, the movable bodies 54, 55 are locked in position and will not be displaced when the force applied in the direction of the arrow 68 is transmitted through the connectors 56, 57 to the movable bodies 54, 55. The movable bodies 54, 55 are thus positioned reliably for allowing recording and reproducing operation.

The non-illustrated reel drive means is then actuated and the rotary head cylinder 50 is rotated to cause the tape 5b to run in sliding contact with the rotary head cylinder 50 for recording or reproducing sounds.

Tape unloading and ejecting the tape cassette 5 will then be described.

The motor 64 is reversed to cause the gear 62 to rotate the rotatable body 58 in the direction of the arrow 69 in FIG. 8, and the reel drive means is actuated to rotate the reel 66 (FIG. 7) to wind the tape 5b therearound. The movable bodies 54, 55 are now guided to move along the guide slots 51, 52 in the directions of the arrows 71, 72 through the pivot shafts 60, 61 and the connectors 56, 57. The movable bodies 54, 55 are then stopped upon engagement of the shafts 54c, 55c with the ends of the guide slots 51, 52 as shown in FIG. 6. The motor 64 is de-energized after the movable bodies 54, 55 are stopped.

When the motor 25 is reversed to move the slide plate 15 in the direction of the arrow 73 in FIG. 1 through the gear 24 and the rack 22, the pin 16 is moved from the lower cam portion 17b through the slanted cam portion 17c into the upper cam portion 17a. The bearing plate 7 and the link 14 are turned in the direction of the arrow 74 in FIG. 4 against the force from the spring 48 (FIG. 2) for lifting the holder 6 away from the reels 65, 66 to the position of Fig. #. As the slide plate 15 moves further in the direction of the arrow 73 (FIG. 1), the end 23a of the cavity 23 in the slide plate 15 engages the end 26a of the lever 26, which is then turned about the pivot shaft 28 in the direction of the arrow 75 (FIG. 1) against the resiliency of the toggle spring 32.

The angular movement of the lever 26 causes the pin 30 to move through the oblong hole 7a in the bearing plate 7 for thereby turning the lever 27, to enable the pivot shafts 37, 38 to move the arms 35, 36 in the directions of the arrows 76, 77 in FIG. 5(b). When the dead point of the toggle spring 32 is cleared, the lever 26 is forcibly turned under the force of the toggle spring 32 to snap the pin 30, the lever 27, the pivot shafts 37, 38, and the arms 35, 36 into quick motion, whereby the tape cassette 5 gripped by the arms 35, 36 is discharged out of the holder 6. The tape cassette 5 is now ejected. The angular movement of the levers 26, 27 is stopped when the pin 30 is engaged by the end 7c of the oblong hole 7a in the bearing plate 7, whereupon the arms 35, 36 are spread as shown in FIG. 5(a).

After the ejecting operation, the non-illustrated control unit issues a drive signal to reverse the motor 25 again and then stop it upon elapse of a certain period of time, during which time the slide plate 15 is slightly moved in the direction of the arrow 67 in FIG. 1. The end 23a of the cavity 23 and the end 26a of the lever 26 are thus spaced from each other by an interval wide enough to allow turning movement of the lever 26.

The above operation serves to permit the tape cassette 5 to be inserted again. If the motor 25 were deenergized at the time of completion of the ejecting operation, the end 26a of the lever 26 would be engaged by the end 23a of the cavity 23, and the lever 26 would remain immovable, so that the tape cassette 5 could not be inserted into the holder 6.

With the above-mentioned arrangement of the present invention, the recorder-reproducer is operated by first actuating the tape cassette loading and unloading mechanism having in the holder 6 the movable arms 35, 36 for gripping the tape cassette 5, and then actuating the tape loading mechanism having the single rotatable body 58 and the connectors 56, 57 coupled thereto. The tape cassette 5 can reliably be positioned in a loading start portion, and the tape 5b from the cassette 5 can reliably be held in sliding contact with the rotary head cylinder 50 for recording and reproducing sounds with digital signals.

Since the arms 35, 36 are movably disposed in the holder 6, the bearing plate 7 and other parts are not required to be unduly large in size, and the recorder-reproducer may be small in size.

The tape cassette 5 can be drawn into and discharged out of the holder 6 by the levers 27, 26 movably mounted on the upper and lower surfaces of the bearing plate 7 and coupled to the arms 35, 36. The means for driving the arms 25, 26 requires a minimum space for installation, a feature which contributes also to a reduction in the size of the recorder-reproducer.

In the illustrated embodiment, the movable bodies 54, 55 are moved through the connectors 56, 57 by the single rotatable body 58. Therefore, the tape loading mechanism is simple, made up of a reduced number of components, and manufactured inexpensively. As the movable bodies 54, 55 are moved by the common rotatable body 58, they move through equalized intervals.

While in the above embodiment the subchassis 1 has the guide slots 51, 52 for guiding the movable bodies 54, 55, the configuration of the movable bodies 54, 55 and the manner in which the movable bodies 54, 55 engage in the guide slots 51, 52 are not limited to the illustrated arrangement. For example, the chassis 2 may be positioned closely to the subchassis 1, the guide slot 51 may be defined in the chassis 2, and the guide slot 52 may be defined in the subchassis 1.

Although the rotatable body 58 is shown as being circular in shape, the invention is not limited to such a shape. The rotatable body 58 may have a recessed portion, for example.

Although the rotatable body 58 is shown as being positioned between the subchassis 2 and the chassis 1, the invention is not limited to such a construction. As another example, the rotatable body 58 may be disposed as substantially high as the chassis 1 or the subchassis 2.

While in the above embodiment the connectors 56, 57 are coupled to the rotatable body 58 on one surface thereof, the connector 56 may be coupled to a back side of the rotatable body 58, while the connector 56 may coupled to a face side of the rotatable body 58.

In the above embodiment, each the connectors 56, 57 is composed of a single member. However, each of the connectors 56, 57 may be composed of a plurality of members.

Both the motors 25, 64 may be mounted on the subchassis 2 or the chassis 1.

ADVANTAGES OF THE INVENTION

As described above, a recorder-reproducer according to the present invention has a sole rotatable body and a pair of connectors coupled thereto for moving a tape from a tape cassette in directions toward and away from a rotary head cylinder. The tape can reliably be brought into and out of sliding contact with the rotary head cylinder for recording and reproducing sounds with digital signals.

The tape loading mechanism is simple, composed of a small number of parts, and manufactured at a reduced cost.

Since a pair of movable bodies engageable with the tape is moved by a single rotatable body, the movable bodies move equal intervals stably at all times.

The recorder-reproducer also includes a pair of arms for gripping the tape cassette to take the tape cassette into and out of a holder. The arms can reliably be located in a prescribed position prior to the tape cassette being loaded or a prescribed position prior to the tape cassette being ejected. Therefore, the tape cassette can be loaded and unloaded with high accuracy for recording and reproducing sounds with digital signals.

Furthermore, a pair of levers is movably mounted on upper and lower surfaces of a bearing plate disposed above the holder, the levers being coupled to the arms, respectively. The tape cassette can be drawn into and discharged out of the holder through cooperative operation of the levers and the arms. This arrangement also allows the tape cassette to be reliably located in a prescribed position prior to the tape cassette being loaded or a prescribed position prior to the tape cassette being ejected. Therefore, the tape cassette can be loaded and unloaded with high accuracy for recording and reproducing sounds with digital signals.

Since the arms are driven through the levers on the bearing plate, the space required for installation of an arm drive means is held to a minimum, and the recorder-reproducer is reduced in size.

Although a certain preferred embodiment has been shown and described, it should be understood that many changes and modifications may be made therein without departing from the scope of the appended claims.

What is claimed is:

1. A device for loading and unloading a tape cassette in position in a magnetic tape recorder-reproducer apparatus of the type having a chassis for receiving a tape cassette inserted horizontally in a longitudinal direction in a front part and toward a rear part of the chassis, said device comprising:

a holder (6) having a horizontal insertion path defined therein extending in the longitudinal direction for receiving the tape cassette inserted in said chassis;

a pair of slots (43,44) formed in said holder extending in the longitudinal direction of the chassis along each of two lateral sides of the insertion path of said holder which are spaced apart in a transverse direction perpendicular to the longitudinal direction;

a pair of arms (35,36) mounted in said holder each having one end movably disposed on a respective one of the lateral sides part of the way along the insertion path where it is engaged and pushed longitudinally toward the rear part of the chassis by the tape cassette as it is inserted in said holder, a guide portion (45,46) at the other end of each arm disposed toward the front part of the chassis which is engaged in a respective one of said slots and slidable therealong, and a finger portion (41,42) on each guide portion extending in the transverse direction for gripping a respective lateral side of the tape cassette, wherein as the tape cassette is inserted in said holder, it engages said one ends of said arms and pushes them longitudinally toward the rear part of the chassis along the insertion path, and the guide portions at the other ends of said arms slide in said slots and move said fingers to grip the sides of the tape cassette;

a bearing plate (7) disposed horizontally on an upper part of said holder over the insertion path of said holder;

a pair of levers (26,27) arranged horizontally in scissors fashion on said bearing plate, each having one end pivotally mounted to said bearing plate and its other end connected to the one end of a respective one of said arms;

a toggle spring (32) connected to said levers such that as the other ends of said levers are moved toward the rear part of the chassis together with the one ends of said arms pushed by the tape cassette inserted partway along the insertion path, said toggle spring reaches a reversing point whereupon it forces the other ends of said levers further toward the rear part of the chassis over a remaining part of the insertion path, whereby the tape cassette inserted partway in said holder is first gripped along its lateral sides by said finger portions of said arms, and at the reversing point of said toggle spring, is pulled along the remaining part of the insertion path by said levers forced by said toggle spring.

2. A tape cassette loading and unloading device as claimed in claim 1, wherein said levers are disposed one above and one below said bearing plate with their one ends pivotally mounted toward respective sides of said bearing plate, and middle portions of said each of levers are connected to each other by a pin guided along a guide slot in said bearing plate so that the other ends of said levers can be moved with said one ends of said arms back along the insertion path in a scissors-type movement.

3. A tape cassette loading and unloading device as claimed in claim 1, wherein said tape cassette has a pair of notches (39,40) each on a respective lateral side of the tape cassette, and said arms grip the tape cassette by engagement of the fingers thereof in said notches.

* * * * *